United States Patent
Shields et al.

(10) Patent No.: US 6,295,711 B1
(45) Date of Patent: Oct. 2, 2001

(54) METHOD OF MAKING A SUNROOF SUNSHADE

(75) Inventors: Scott D. Shields, White Lake, MI (US); James R. Mestemaker, Sylvania, OH (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/597,867

(22) Filed: Jun. 20, 2000

(51) Int. Cl.[7] ........................................................ B23P 17/00
(52) U.S. Cl. .............................. 29/415; 296/214; 29/91.1; 29/412
(58) Field of Search ................................ 29/897.2, 412, 29/415, 416, 417, 418, 91.1, 401.1; 296/214, 97.9, 97.11

(56) References Cited

U.S. PATENT DOCUMENTS

| | | |
|---|---|---|
| 2,635,917 * | 4/1953 | Newman . |
| 4,077,821 * | 3/1978 | Doerfling . |
| 4,923,244 | 5/1990 | Clenet . |
| 4,936,623 * | 6/1990 | Huyer . |
| 5,005,899 | 4/1991 | Clenet . |
| 5,280,991 * | 1/1994 | Weiland . |
| 5,833,304 * | 11/1998 | Daniel et al. . |
| 5,893,603 * | 4/1999 | Viertel et al. . |
| 5,976,295 * | 11/1999 | Ang . |
| 6,004,415 | 12/1999 | Ko . |
| 6,059,010 | 5/2000 | Yang . |

* cited by examiner

Primary Examiner—David P. Bryant
Assistant Examiner—Steven A Blount
(74) Attorney, Agent, or Firm—Brooks & Kushman PC

(57) ABSTRACT

A method of manufacturing a sunshade for use with a vehicle having a sunroof includes cutting away material from a headliner to form a cutout and to define a sunroof opening in the headliner; and attaching edging to the cutout to form the sunshade. The sunshade produced by the method has improved color match and/or texture match with the headliner.

12 Claims, 1 Drawing Sheet

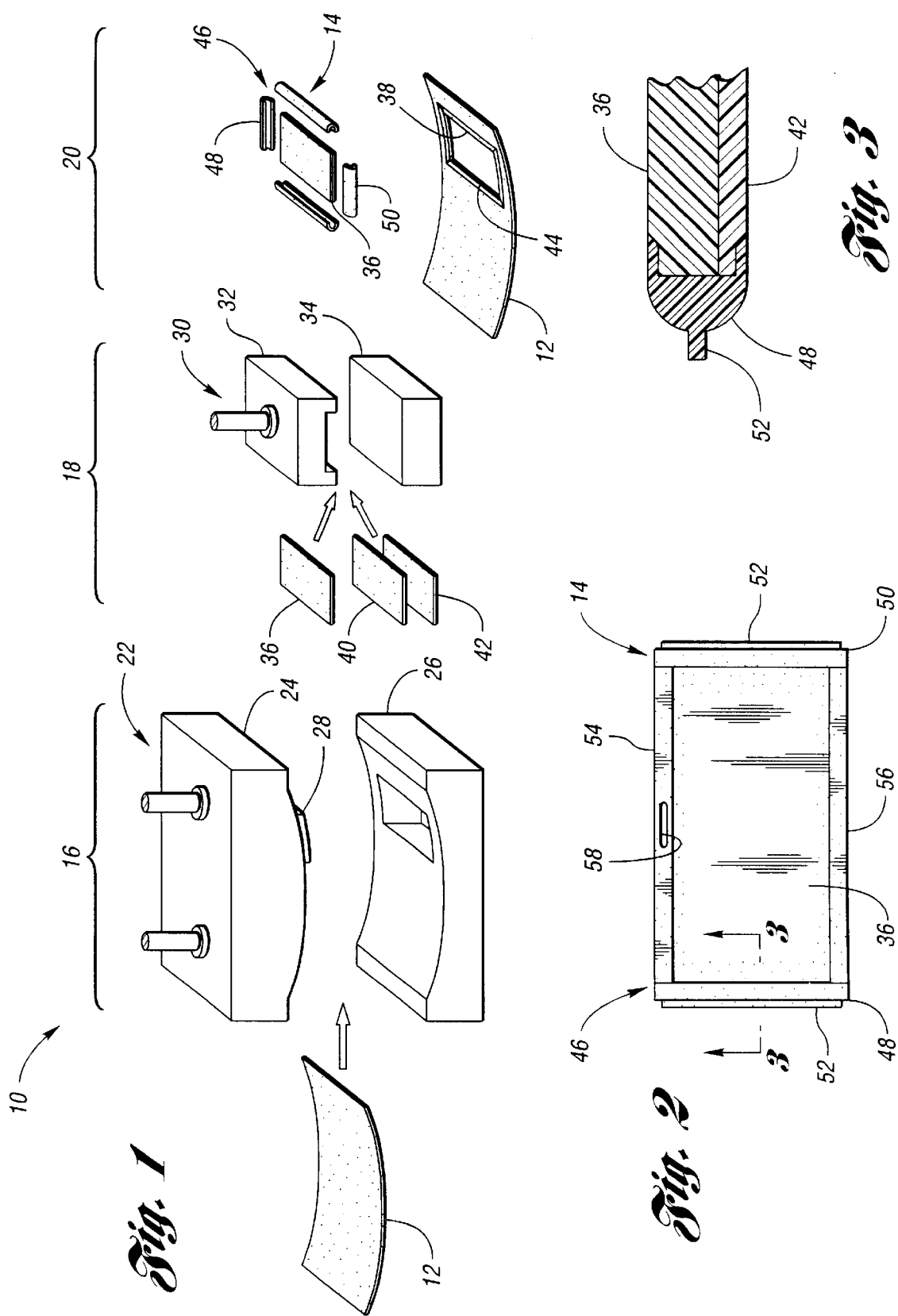

METHOD OF MAKING A SUNROOF SUNSHADE

TECHNICAL FIELD

The invention relates to a method of manufacturing a sunshade for use with a vehicle having a sun roof.

BACKGROUND ART

Many vehicles are provided with a sunroof assembly that includes a frame attached to a vehicle roof, and a moveable sunroof connected to the frame. Such an assembly also typically includes a sunshade connected to the frame and disposed beneath the sunroof. The sunshade is moveable between open and closed positions so as to cover a sunroof opening formed in a headliner of a particular vehicle.

A prior method of manufacturing a sunshade includes forming a substrate to a desired size and shape, and attaching a cover layer to the substrate. Known substrates include aluminum sheets, injection molded plastic, sheet molding compound, compressed resinated-fiber mats, and sprayed urethane. Because the sunshade is formed separately from a corresponding headliner, it is difficult to obtain a good color match and/or texture match between the sunshade and the headliner. Furthermore, because the sunshade and headliner are formed separately, the combined manufacturing costs are significant.

DISCLOSURE OF INVENTION

The invention addresses the shortcomings of the prior art by providing a method of manufacturing a sunshade that includes utilizing material removed from a headlliner. The method according to the invention significantly reduces manufacturing costs as well as disposal costs. Furthermore, the sunshade produced by the method has improved color match and texture match with the corresponding headliner.

Under the invention, a method of manufacturing a sunshade for use with a vehicle having a sunroof includes cutting away material from a headliner to form a cutout and to define a sunroof opening in the headliner; and attaching edging to the cutout to form the sunshade.

Preferably, the step of attaching edging to the cutout includes attaching first and second edge pieces to first and second sides, respectively, of the cutout so that the sunshade has a lateral dimension that is at least as great as a lateral dimension of the sunroof opening in the headliner. Furthermore, the step of attaching edging to the cutout may also include attaching front and rear edge pieces to front and rear portions, respectively, of the cutout so that the sunshade has a longitudinal dimension that is at least as great as a longitudinal dimension of the sunroof opening in the headliner.

The method also preferably includes attaching a reinforcing layer to the cutout for stiffening the cutout. The reinforcing layer and the cutout may be attached together in any suitable manner such as with rollers or a press. Furthermore, the reinforcing layer may comprise any suitable material such as fiberglass, plastic and/or natural fibers.

These and other objects, features and advantages of the invention are readily apparent from the following detailed description of the best modes for carrying out the invention when taken in conjunction with the accompanying drawings.

BRIEF DESCRIPTION OF DRAWINGS

FIG. 1 is a schematic diagram of an apparatus for manufacturing a headliner and a sunshade according to the invention;

FIG. 2 is a bottom view of the sunshade;

FIG. 3 is a fragmentary cross-sectional view of the sunshade taken along line 3—3 of FIG. 2.

BEST MODES FOR CARRYING OUT THE INVENTION

FIG. 1 shows an apparatus 10 for manufacturing a headliner 12 and a sunshade 14 according to the invention for use with a motor vehicle. The apparatus 10 includes a cutting station 16, a lamination station 18, and an edging station 20. The cutting station 16 includes a die assembly 22 having first and second mating dies 24 and 26, respectively. At least one of the dies 24 and 26 includes a cutting element 28. The lamination station 18 includes a press 30 having first and second press sections 32 and 34, respectively. The press sections 32 and 34 are preferably, but not necessarily, heated.

Referring to FIGS. 1 through 3, a method according to the invention of manufacturing the headlliner 12 and sunshade 14 includes forming the headliner 12 in any suitable manner. For example, the headliner 12 may be formed by molding together a substrate, an adhesive layer and a cover layer. The substrate may include, for example, a urethane core sandwiched between fiberglass mats. Adhesive layers may also be positioned within the substrate to improve bonding of the various elements. As another example, the substrate may include one or more polyester fiber mats.

Next, the headliner 12 is positioned between the dies 24 and 26. The dies 24 and 26 are then closed together to cut away material from the headliner 12 so as to form a cutout 36 and to define a sunroof opening 38 in the headliner 12. Alternatively, material may be cut away from the headliner 12 in any suitable manner so as to from the cutout 36. For example, material may be cut away from the headliner 12 manually or automatically, such as with a robotic water jet or a lazer.

Rather than discarding the cutout 36 as in prior methods, the cutout 36 is then positioned between-the press sections 32 and 34, along with an adhesive layer 40 and a reinforcing layer 42. The reinforcing layer 42 is used to stiffen the cutout 36 and may comprise any suitable material. For example, the reinforcing layer 42 may comprise a fiberglass mat, a polyester mat, a polypropylene mat, a cloth layer, synthetic fibers, and/or natural fibers such as hemp, wood and sisal. The reinforcing layer 42 and the adhesive layer 40 may also be provided as a single member. For example, the reinforcing layer 42 and the adhesive layer 40 may be preformed as a laminate assembly such as a paper composite, which may include a paper layer and an adhesive film such as a polyethylene film joined to the paper layer.

The adhesive layer 40 and reinforcing layer 42 are preferably heated in any suitable manner, such as in an oven (not shown), prior to being positioned between the press sections 32 and 34. The cutout 36 may also be heated in a similar manner. Alternatively or supplementally, one or more of the cutout 36, the adhesive layer 40 and the reinforcing layer 42 may be heated by one or both of the press sections 32 and 34. Furthermore, heating of one or more of the cutout 36, the adhesive layer 40 and the reinforcing layer 42 may be eliminated if not required for a particular application. For example, the adhesive layer 40 may comprise an adhesive that does not require heat-activation.

The press sections 32 and 34 are then closed together to attach the reinforcing layer 42 to the cutout 36. Alternatively, the reinforcing layer 42 may be attached to the cutout 36 in any suitable manner such as by feeding the cutout 36 and reinforcing layer 42 through heated rollers, or the reinforcing layer 42 may be eliminated if not required for a particular application.

As yet another alternative, a reinforcing layer may be attached to the headliner 12 during formation of the headliner 12. For example, a reinforcing layer comprising similar materials as the reinforcing layer 42 may be attached to a front portion of the headliner 12, or to the entire headliner 12, during molding of the headliner 12.

Next, the headliner 12 and the cutout 36 are transferred to the edging station 20. Edging 44 is then attached to the headlliner 12 proximate the sunroof opening 38 so as to reduce the size of the sunroof opening 38 and to provide an aesthetically pleasing appearance along the perimeter of the sunroof opening 38. The edging 44 may comprise any suitable material such as steel or injection molded plastic. Furthermore, the edging 44 may be attached to the headliner 12 in any suitable manner such as with adhesive.

Edging 46 is also attached to the cutout 36 at the edging station 20 so as to form the sunshade 14. The edging 46 cooperates with the cutout 36 to provide the sunshade 14 with a sufficient size so that the sunshade 14 will substantially cover the sunroof opening 38. Preferably, but not necessarily, the edging 46 cooperates with the cutout 36 to provide the sunshade 14 with larger lateral and longitudinal dimensions than the sunroof opening 38. The edging 46 may be provided as a unitary structure into which the cutout 36 may be inserted, or the edging 46 may comprise multiple pieces as shown in the Figures.

The edging 46 may include, for example, first and second side pieces 48 and 50, respectively, that are attached to first and second sides, respectively, of the cutout 36. Furthermore, each of the side pieces 48 and 50 preferably includes a slide element 52. The slide elements 52 are engageable with guides in a sunroof frame (not shown), or other component of a sunroof assembly, so that the sunshade 14 may be moveably connected to the sunroof frame.

The edging 46 also preferably includes front and rear pieces 54 and 56, respectively, that are attached to front and rear portions, respectively, of the cutout 36. The front and rear pieces 54 and 56, respectively, cooperate with the side pieces 48 and 50 to stiffen the sunshade 14. The front piece 54 also has a integrally formed handle 58 for manually opening and closing the sunshade 14 when the sunshade is connected to the sunroof assembly.

Similar to the edging 44, the edging 46 may also comprise any suitable material such as steel or injection molded plastic. Furthermore, the edging 46 may be attached to the cutout 36 in any suitable manner such as with adhesive.

Because the cutout 36 is used to form the sunshade 14, manufacturing costs are significantly reduced compared with prior methods of manufacturing sunshades. Disposal costs are also reduced since the cutout 36 is not discarded. Furthermore, because the cutout 36 is taken from the headliner 12, color match and texture match between the sunshade 14 and headliner 12 are improved.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of manufacturing a sunshade for use with a vehicle having a sunroof, the method comprising:

cutting away material from a headliner to form a cutout and to define a sunroof opening in the headliner; and attaching edging to the cutout to form the sunshade.

2. The method of claim 1 wherein attaching edging to the cutout includes attaching first and second edge pieces to first and second sides, respectively, of the cutout so that the sunshade has a lateral dimension at least as great as a lateral dimension of the sunroof opening in the headliner.

3. The method of claim 1 wherein attaching edging to the cutout includes attaching front and rear edge pieces to front and rear portions, respectively, of the cutout so that the sunshade has a longitudinal dimension at least as great as a longitudinal dimension of the sunroof opening in the headliner.

4. The method of claim 1 further comprising attaching a reinforcing layer to the cutout.

5. The method of claim 4 wherein attaching a reinforcing layer includes attaching the reinforcing layer to the cutout using rollers.

6. The method of claim 4 wherein attaching a reinforcing layer includes attaching the reinforcing layer to the cutout using a press.

7. The method of claim 4 wherein the reinforcing layer includes fiberglass.

8. The method of claim 4 wherein the reinforcing layer includes plastic.

9. The method of claim 4 wherein the reinforcing layer includes natural fibers.

10. The method of claim 4 wherein the reinforcing layer includes a cloth layer.

11. The method of claim 4 wherein the reinforcing layer includes a paper layer.

12. A method of manufacturing a headliner and sunshade for use with a vehicle having a sun roof assembly, the method comprising:

forming the headliner;

cutting away material from the headliner to form a cutout and to define a sunroof opening in the headliner;

attaching a reinforcing layer to the cutout;

attaching edging to the cutout to form the sunshade, the sunshade having a first lateral dimension; and attaching edging to the headliner proximate the sunroof opening so so that the sunroof opening has a second lateral dimension;

wherein the first lateral dimension is at least as great as the second lateral dimension.

\* \* \* \* \*

UNITED STATES PATENT AND TRADEMARK OFFICE
CERTIFICATE OF CORRECTION

PATENT NO.     : 6,295,711 B1
DATED          : October 2, 2001
INVENTOR(S)    : Scott D. Shields et al.

It is certified that error appears in the above-identified patent and that said Letters Patent is hereby corrected as shown below:

<u>Column 4,</u>
Line 54, delete "so".

Signed and Sealed this

Third Day of December, 2002

JAMES E. ROGAN
*Director of the United States Patent and Trademark Office*